Dec. 15, 1953          J. R. RISTOW          2,662,778
LEG ASSEMBLY FOR WHEELED TRUCKS
Filed Dec. 22, 1950          2 Sheets-Sheet 1
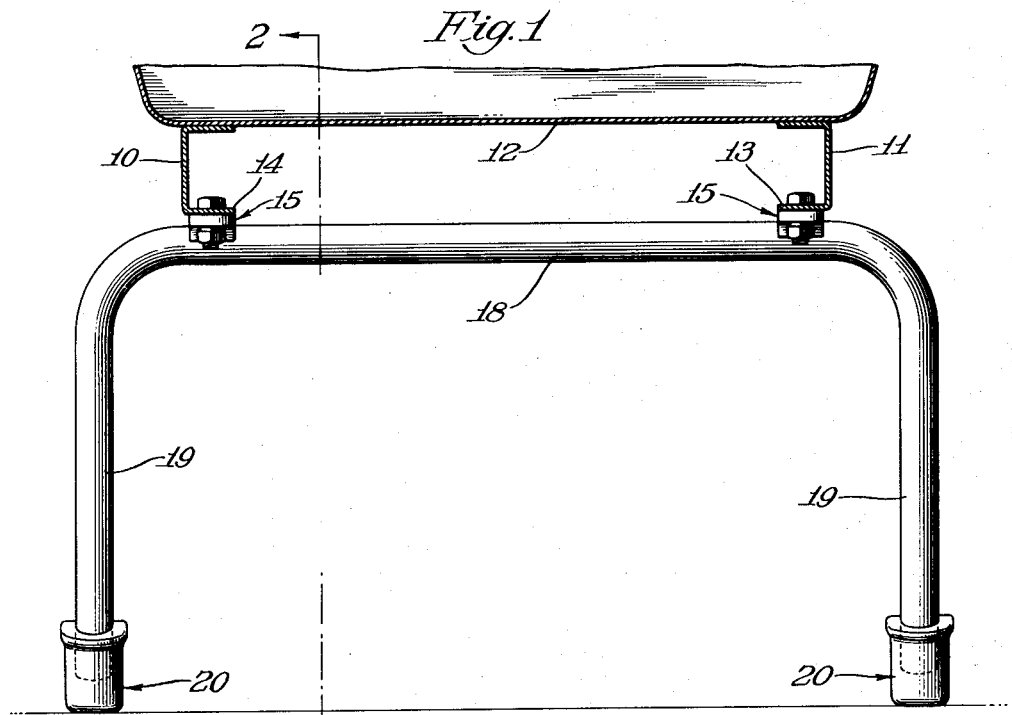
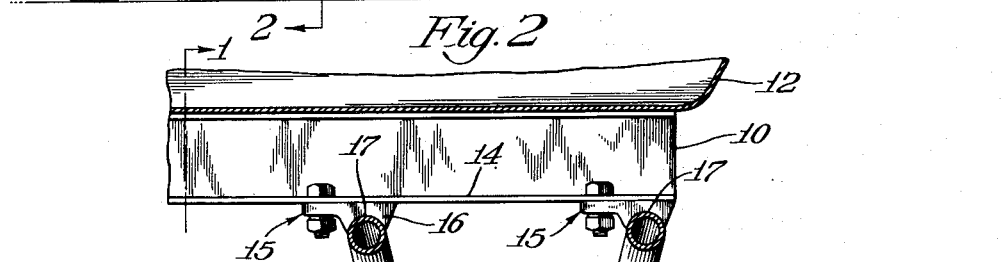
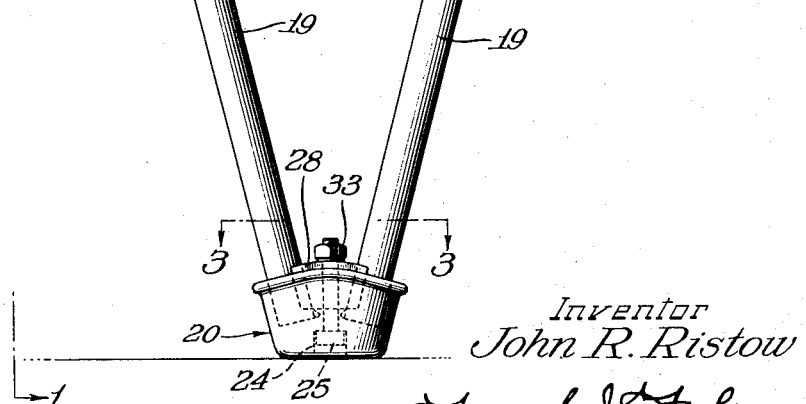
Inventor
John R. Ristow Dec. 15, 1953  J. R. RISTOW  2,662,778
LEG ASSEMBLY FOR WHEELED TRUCKS
Filed Dec. 22, 1950  2 Sheets-Sheet 2
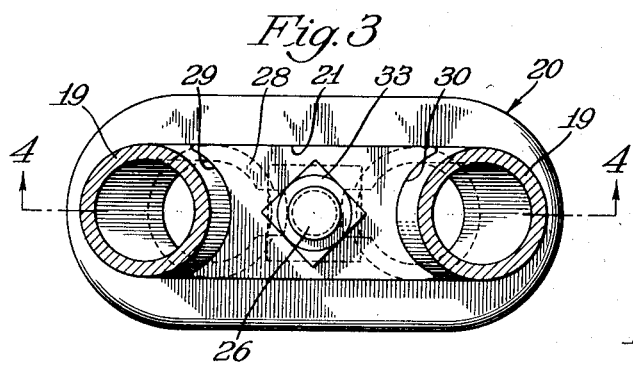
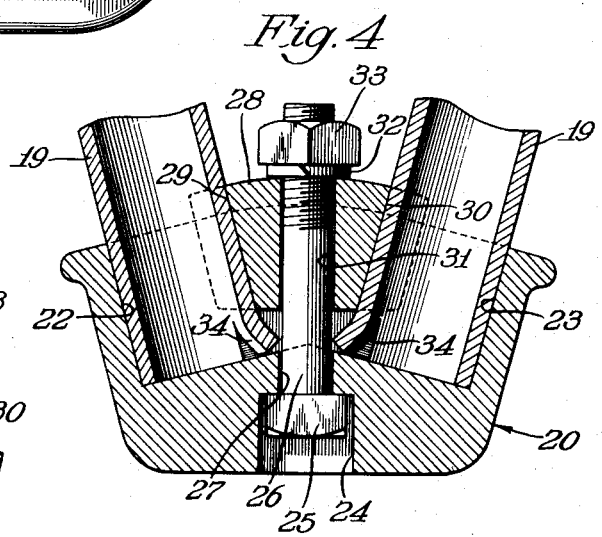
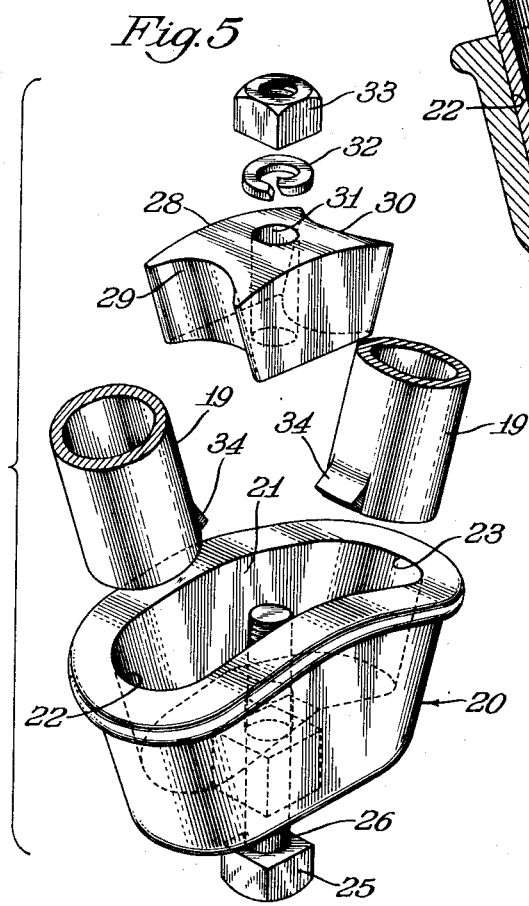
Inventor
John R. Ristow
by Frank J. Foley
Atty Patented Dec. 15, 1953

2,662,778

UNITED STATES PATENT OFFICE 2,662,778

LEG ASSEMBLY FOR WHEELED TRUCKS

John R. Ristow, Chicago, Ill., assignor to St. John & Co., Chicago, Ill., a corporation of Illinois Application December 22, 1950, Serial No. 202,240

1 Claim. (Cl. 280—47.33)

This invention relates to improvements in leg assemblies for wheeled trucks and particularly to leg assemblies for hand pushed trucks having a pair of wheels and a pair of rigid legs, upon which legs the trucks may be balanced and rested when the trucks are not in motion. Hand trucks having two wheels and two legs, for use in factories, packing houses and other business establishments have been in use for many decades and many different leg constructions have been devised in the effort to provide durable and not too costly legs suitable for the rigorous use and heavy loads to which trucks of this character are subjected.

This invention makes feasible in the construction of the legs the use of iron pipes bent to a simple configuration, with the pipe ends anchored to and protected by shoes of a novel design. Intermediate portions of the pipes are then attached to the truck body in a simple, inexpensive, yet very secure manner.

The general object of the invention is, therefore, the provision of a truck leg assembly having the above mentioned and other structural features and advantages.

A preferred form of the invention, selected for illustrative purposes herein is shown in the drawings.

Figure 1 is a sectional view on line 1—1 of Fig. 2 of a portion of a truck body with the leg assembly attached thereto.

Figure 2 is a vertical sectional view on the line 2—2 of Figure 1.

Figure 3 is a horizontal sectional view on the line 3—3 of Figure 2.

Figure 4 is a vertical sectional view on the line 4—4 of Figure 3.

Figure 5 is a disassembled view of the portions shown in Figure 4.

The structure of the bottom of the truck is subject to considerable variation, but preferably includes rigid longitudinally extending channel irons 10 and 11 welded or otherwise permanently secured to the steel truck body 12. Handles for the truck are not shown but it may be assumed that they may be attached either directly to the truck body 12 or to the channel irons or elsewhere. An axle and a pair of wheels of any suitable construction, but not shown, may be assumed to be attached to the truck body forwardly of the legs, that is to the left of Figure 2.

To the flanges 13 and 14 of the channels are detachably bolted four brackets 15 of identical shape, each having a thickened portion 16 provided with a concave recess 17 in which is seated and welded a horizontal portion of the pipe leg assembly. In this assembly two pipes which may be of identical conformation are employed.

Each pipe has a horizontal portion such as 18 and depending legs such as 19, which extend into the shoes, such as 20.

As may be seen in Fig. 5 each shoe has a recess 21, the opposite end portions 22 and 23 of which are shaped and proportioned to receive snugly the lower end of the pipe legs, as shown. Each shoe has a bottom recess 24 of square cross section to receive and to hold against rotation the head 25 of a bolt whose cylindrical shank 26 extends upwardly through a cylindrical bore 27 provided in the shoe 20.

A wedge block 28 having opposite concave recesses 29 and 30 for snugly engaging the pipe ends and a central bore 31 to receive the bolt shank 26 is employed as shown in Figure 4 together with the bolt and a lock washer 32 and nut 33 to hold the pipe ends snugly and firmly seated in the shoe 20. Thus, the pipe legs are held locked as shown in position to support the truck, when at rest, in cooperation with the wheels previously mentioned, but not shown.

While the frictional engagement and wedging action of the wedge block in conjunction with the shape of the recesses in the shoes may adequately retain the pipe ends against accidental disengagement, it is preferred that a toe such as 34 be struck out from the bottom edge of each pipe leg, as shown, or some other equivalent projection be provided to insure a more positive locking engagement or function to hold the pipe legs in the shoes. Such added feature is found also to be a convenience during assembly, and should a nut become loose, without falling off, the assembly of pipe legs and shoe will still be retained.

Not only do the shoes afford a simple and economical means of facilitating the use of relatively easily fabricated pipe legs, but the shoes provide rugged, durable floor contacting ends or shields for the pipe leg construction. The bottom surface 35 is a good, practical skid surface, suitable for rugged use. The shoes may be castings or forgings, as desired, Another feature and advantage of this pipe leg construction should be noted here. While this leg assembly may be attached to any two wheeled truck, or even to a single wheeled truck or wheel barrow, used for any purpose, the assembly was especially designed for two wheeled hand trucks used in meat packing houses. Such trucks are required to be thoroughly washed and sterilized daily, and it is important that in such trucks there be the minimum of crevices or other conformations in which dirt could lodge and not be easily removed. These leg shoes and legs are obviously readily cleanable with the aid of hot water and steam hoses.

While the drawings disclose a preferred embodiment of the invention it should be recognized that the invention is susceptible of some modification and variation, without departure from the spirit and scope of the invention as defined in the appended claim.

Having shown and described my invention, I claim:

A leg assembly in combination with a vehicle body comprising a pair of cylindrical pipes each bent to U-shaped conformation in a single plane, and each having a horizontal portion extended across and beneath the vehicle body and leg portions depending from opposite ends of the horizontal portion constituting the terminal ends of the pipes, means for detachably securing said horizontal portions in parallel spaced apart positions to the underside of the vehicle body, with the terminal ends of the leg portions at each vehicle side directed to approach without meeting each other, a pair of shoes each having an upwardly opening recess of generally elliptical shape in horizontal cross-section receiving the extremities of a pair of said leg portions in spaced apart relation, a wedge member having a central vertical bore and having concaved end walls spaced from each other and from said bore partially embracing the pipe end portions and positioned between them largely within said shoe recess and cooperating therewith to substantially close the entire opening of said recess, the terminal end of each pipe having a radially extending strike out projection engaged by the underside of said wedge member, and means urging each wedge member into wedging relation with said pipe extremities and projections to secure them to said shoe, said last means including a bolt extending through the bottom of each shoe and through the bore of each wedge.

JOHN R. RISTOW.

References Cited in the file of this patent
UNITED STATES PATENTS

| Number | Name | Date |
|---|---|---|
| 816,655 | Garver | Apr. 3, 1906 |
| 993,805 | Tallman | May 30, 1911 |
| 1,031,454 | Lawrence | July 2, 1912 |
| 1,180,009 | Chein | Apr. 18, 1916 |
| 1,488,176 | Schofield | Mar. 25, 1924 |